United States Patent [19]

Atkin

[11] 4,339,986

[45] Jul. 20, 1982

[54] POWER STEERING APPARATUS

[75] Inventor: Rupert L. Atkin, St. Clair Shores, Mich.

[73] Assignee: TRW Inc., Cleveland, Ohio

[21] Appl. No.: 140,451

[22] Filed: Apr. 17, 1980

[51] Int. Cl.³ ............................................. F15B 9/10
[52] U.S. Cl. ............................. 91/375 A; 137/625.24
[58] Field of Search ................. 91/375 A; 137/625.24

[56] References Cited

U.S. PATENT DOCUMENTS

| | | |
|---|---|---|
| 2,757,748 | 8/1956 | MacDuff . |
| 3,393,608 | 7/1968 | Saunders . |
| 3,657,967 | 4/1972 | Suzuki . |
| 3,709,099 | 1/1973 | Dumeah . |
| 3,998,131 | 12/1976 | Adams ............................... 91/375 A |
| 4,034,825 | 7/1977 | Adams ............................... 91/375 A |

Primary Examiner—Paul E. Maslousky
Attorney, Agent, or Firm—Yount & Tarolli

[57] ABSTRACT

An improved a power steering apparatus includes a fluid motor which is connected with a steerable vehicle wheel by a rack gear. The fluid motor has a piston with a relatively large head end surface area and a relatively small rod end surface area. In order to compensate for the difference in the head and rod end surface areas, actuation of a steering control valve assembly is resisted with a greater force when fluid pressure is being directed toward the head end surface area than when fluid pressure is being directed toward the rod end surface area. The force resisting actuation of the valve assembly is exerted by a spring assembly which includes a torsion bar disposed within a torsion tube. When the valve assembly is actuated to direct fluid pressure toward the relatively large head end surface area of the piston, both the torsion tube and bar are deflected. When the valve assembly is actuated to direct fluid pressure toward the relatively small rod end surface area, only the torsion bar is deflected.

32 Claims, 5 Drawing Figures

POWER STEERING APPARATUS

BACKGROUND OF THE INVENTION

A new and improved power steering apparatus includes valve and spring assemblies which are effective to compensate for differences in size of operating surface areas of a power steering motor.

In known power steering systems, a piston and cylinder type fluid motor is connected with a rack gear. Upon actuation of a valve assembly, fluid pressure is ported to either the head end or the rod end of the piston to effect operation of the motor to assist in turning a steerable vehicle wheel. In these known power steering systems, the piston rod does not extend completely through the power steering motor so that the head end surface area of the piston is greater than the rod end surface area. Therefore, if the same fluid pressure is applied against the head end surface area during turning movement in one direction and against the rod end surface area during turning movement in the opposite direction, a greater force is applied to the rack gear during turning movement in the direction in which fluid pressure is applied against the head end surface area.

With these known power steering systems, the resistance of the power steering control valve to actuation in either direction is the same if the valve is moved through the same distance. Therefore, the feel or resistance which is transmitted back to an operator of the vehicle is the same when the power steering valve is actuated through the same distance to effect a turn in either direction. This is true even though the output force of the power steering motor is different in one direction than the other due to the difference in the size of the head and rod end surface areas. Typical of these known power steering systems are the ones disclosed in U.S. Pat. Nos. 3,709,099 and 3,303,051.

In a power steering system disclosed in U.S. Pat. No. 3,393,608, a torsion bar is utilized to provide feel to an operator upon actuation of a valve assembly. Clockwise rotation of a steering wheel is effective to twist one-half of the torsion bar. Counterclockwise rotation of the steering wheel is effective to twist only the other half of the torsion bar. The two halves of the torsion bar have equal resistance to turning movement.

Upon rotation of a steering wheel in one direction, fluid pressure is ported to a relatively large head end surface area of a piston by the steering control valve assembly disclosed in the aforementioned U.S. Pat. No. 3,393,608. Upon rotation of the steering wheel in the opposite direction, fluid pressure is ported to the relatively small rod end surface area of the piston. Although the torsion bar utilized in this patent provides equal resistances to actuation of the valve in opposite directions, the output force from the power steering motor is not the same in each direction since the head end surface area of the piston is larger than the rod end surface area.

In order to compensate for the unequal head and rod end surface areas of the piston of a power steering motor, U.S. Pat. No. 2,757,748 suggests that a power steering control valve have reaction surface areas which are sized to be proportional to the head and rod end surface areas of the piston of the power steering motor. Fluid pressure directed against the reaction surface areas of the valve is effective to apply a force to the valve which varies as a function of the force provided by the power steering motor. However, the use of hydraulic pressure against different size surface areas of a valve results in a relatively complicated valve structure which may be difficult to fabricate and may be unsuitable for use with many different types of power steering systems.

SUMMARY OF THE PRESENT INVENTION

The present invention provides a new and improved apparatus for use in a power steering system to effect turning movement of a steerable vehicle wheel. The apparatus includes a power steering motor having surface areas of different sizes against which fluid pressure is sequentially applied to effect sequential turning movement of a steerable vehicle wheel in different directions. A spring assembly is provided to resist actuation of a control valve assembly which ports fluid pressure to the power steering motor.

In accordance with a feature of the present invention, the spring assembly is effective to resist actuation of the valve assembly with a force which varies as a function of both the extent of actuation of the valve assembly and the size of the motor surface area against which fluid pressure is being directed. When fluid pressure is being directed against a relatively large surface area of the power steering motor, the spring assembly provides a relatively large resistance to each increment of actuation of the valve assembly. Similarly, when fluid pressure is being directed against a relatively small surface area of the power steering motor, the spring assembly provides a relatively small resistance to each increment of actuation of the valve assembly. Therefore, when equal forces are applied to effect actuation of the valve assembly in opposite directions, equal output forces are obtained from the power steering motor even though the pressurized operating surface areas of the power steering motor are of different sizes.

In one specific embodiment of the invention, the power steering motor is connected with a rack gear which is movable along its longitudinally extending central axis to effect turning movement of a steerable vehicle wheel. A rotatable pinion gear is disposed in meshing engagement with the rack gear. The pinion gear effects operation of the valve assembly from an actuated condition to an unactuated condition upon movement of the steerable vehicle wheel through a distance corresponding to the extent of rotation of a steering wheel.

The valve assembly includes a valve spool which is rotatable relative to a valve sleeve in a first direction to port fluid pressure to the head end of the power steering motor. Upon actuation of the valve assembly in a second or opposite direction, fluid pressure is ported to the rod end of the power steering motor. A spring assembly resists each increment of valve spool rotation in one direction with a greater spring force than the other direction.

The spring force which resists each increment of actuation of the valve assembly in a direction porting fluid pressure to the head end of the motor is greater than the spring force which resists each increment of actuation of the valve assembly in a direction porting fluid pressure to the rod end of the motor. The two spring forces are in the same ratio as the head and rod end surface areas of the power steering motor. Therefore, the forces which are felt by an operator are proportional to the output force of the power steering motor.

The spring assembly includes a torsion bar which is disposed within a torsion tube. Upon actuation of the valve assembly to direct fluid pressure toward the relatively large head end surface area of the piston, both the torsion tube and bar are deflected to provide a relatively strong spring force resisting each increment of rotational movement of the valve spool. Upon actuation of the valve assembly in the opposite direction to direct fluid pressure toward the relatively small rod end surface area of the piston, only the torsion bar is deflected so that there is a relatively small resistance to each increment of rotational movement of the valve spool.

Accordingly, it is an object of this invention to provide a new and improved apparatus in which a valve assembly is actuatable in opposite directions to direct fluid pressure against different size operating surface areas of a power steering motor and wherein a spring assembly resists actuation of the valve assembly in a direction porting fluid pressure toward a relatively large operating surface area of the motor with a relatively large force and wherein the spring assembly resists actuation of the valve assembly in a direction porting fluid pressure toward a relatively small operating surface area of the motor with a relatively small force.

Another object of the invention is to provide a new and improved apparatus as set forth in the next preceding object and wherein the spring assembly includes a torsion bar and a torsion tube.

Another object of this invention is to provide a new and improved apparatus for use in a power steering system to effect turning movement of a steerable vehicle wheel and wherein the apparatus includes a valve assembly having a torsion tube disposed within a valve member and a torsion bar disposed within the torsion tube, both the torsion tube and bar being deflected upon rotation of the valve member in one direction to provide a first spring force resisting rotational movement of the valve member and only one of the torsion bar and tube being deflected upon rotation of the valve member in the opposite direction to provide a relatively small spring force resisting rotational movement of the valve member.

Another object of this invention is to provide a new and improved power steering apparatus having a motor connected with a rack gear and wherein rotation of a valve spool in a direction porting fluid pressure to a relatively large head end surface area of a piston is resisted with a relatively large force and rotation of a valve spool in a direction porting fluid pressure to a relatively small rod end surface area of the piston is resisted with a relatively small force.

BRIEF DESCRIPTION OF THE DRAWINGS

The foregoing and other objects and features of the present invention will become more apparent upon a consideration of the following description taken in connection with the accompanying drawings wherein.

DESCRIPTION OF AN EMBODIMENT

System

Figures 1, 2, 3:
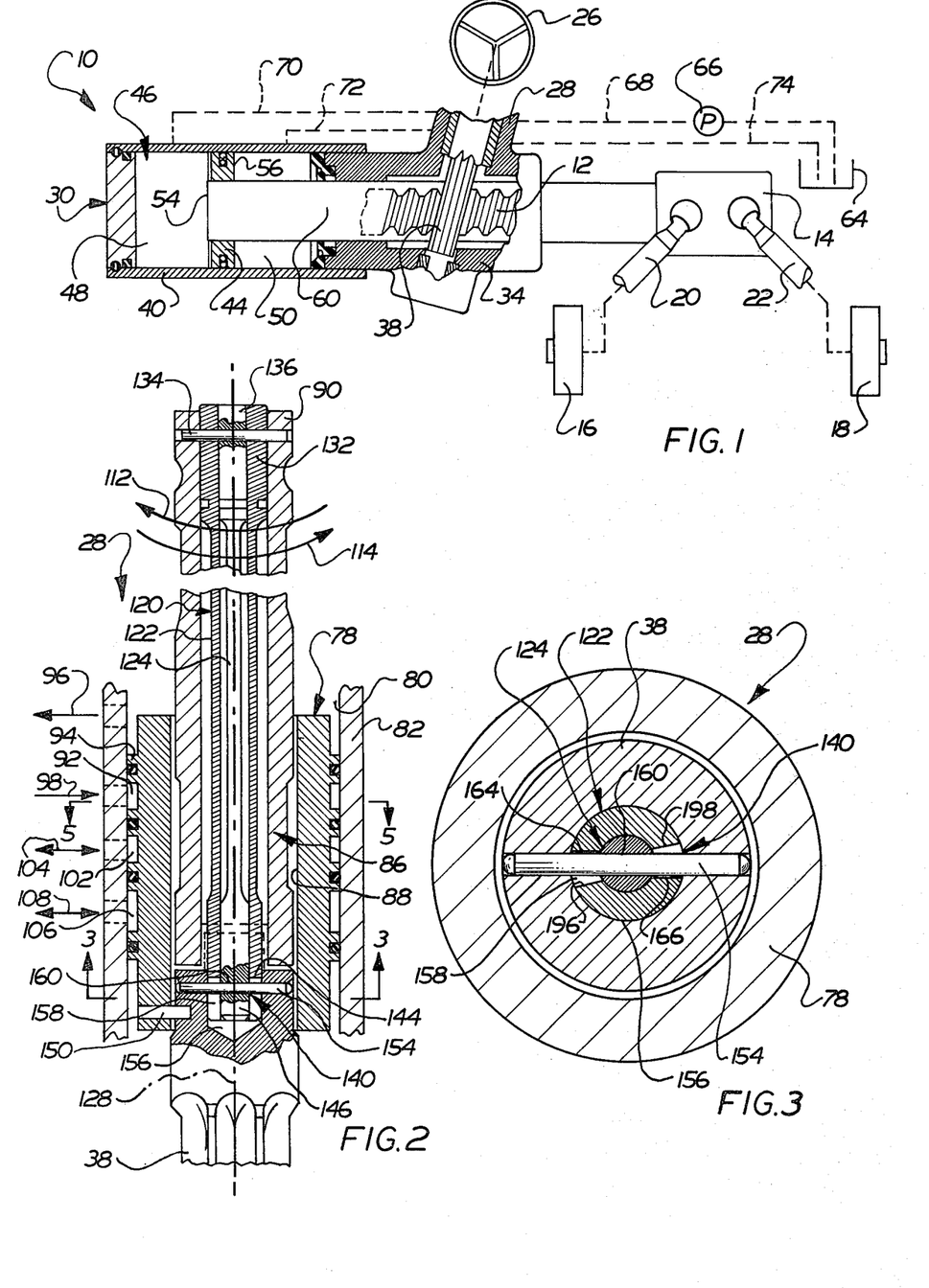
FIG. 1 is a schematic illustration of a power steering system for effecting turning movement of a steerable vehicle wheel.
FIG. 2 is a fragmentary sectional view illustrating the relationship between a valve assembly and a spring assembly used in the power steering system of FIG. 1.
FIG. 3 is a sectional view, taken generally along the line 3—3 of FIG. 2, illustrating a lost motion connection between a torsion bar and torsion tube of the spring assembly of FIG. 2 when the valve assembly is in an initial or fully open condition.

A power steering system 10 constructed in accordance with the present invention includes a longitudinally extending rack gear 12 slidably mounted in a tubular housing 34. One end portion 14 of the rack gear 12 projects from the housing 34 and is connected to a pair of steerable vehicle wheels 16 and 18 by tie rods 20 and 22, respectively. The opposite end portion of the rack gear 12 is connected to a power steering motor. Intermediate its end portions, the rack gear meshes with a pinion gear 38 rotatably supported by the housing 34. The pinion gear is in axial alignment with and is rotatably connected to a valve assembly 28. The valve assembly 28, in turn, is rotatably connected to a steering wheel 26. Rotation of the steering wheel 26 actuates the valve assembly 28 to effect operation of the power steering motor 30, movement of the rack gear 12, and turning of the vehicle wheels 16 and 18.

The power steering motor 30 is of the piston and cylinder type. It includes a tubular housing 40 that is formed as an extension of the rack gear housing 34 and that defines a cylindrical pressure chamber 46. A piston 44 is disposed in the housing 40 and divides the pressure chamber 46 into a variable volume head end chamber 48 and a variable volume rod end chamber 50. The piston 44 has a circular head end surface 54 which is presented to the head end chamber 48. An annular rod end surface 56 on the piston 44 is presented to the rod end chamber 50. The annular shape of the surface 56 is the result of connecting the piston 44 to a piston rod 60. The rod is integrally formed with the rack gear 12 and extends through the rod end chamber 50 between the surface 56 of the piston 44 and the rack gear 12. Because the piston surfaces 54 and 56 have the same outer circumference, the attachment of the rod 60 to the surface 56 causes the area of the surface 54 to be greater than the area of the surface 56 by an amount corresponding to the cross sectional area of the rod 60.

Movement of the piston 44 in the cylinder 40 of the power steering motor 30 will cause longitudinal movement of the rack gear 12. Such movement of the piston 44 is produced by applying fluid pressure to the opposed surfaces 54 and 56 of the piston 44. Fluid to operate the motor 30 is drawn from a reservoir 64 by a pump 66. The output of the pump 66 is connected to a conduit 68 that delivers the high pressure fluid to the valve assembly 28. Depending upon the operating position of the valve asembly 28, fluid from the pump 66 may be ported through a conduit 70 to the head end chamber 48 of the power steering motor 30 or through a conduit 72 to the rod end chamber 50 of the motor. Fluid may also be conducted from the valve assembly 28 back to the reservoir 64 through a drain line 74.

In operation of the power steering system 10, the steering wheel 26 is rotated in one direction or the other to actuate the valve assembly 28. Depending upon the direction of rotation of the wheel 26, the valve assembly 28 causes an increasing amount of fluid to be conducted either to the head end chamber 48 or to the rod end chamber 50 of the power steering motor 30. The other chamber 48 or 50 of the motor 30 communicates to a greater extent with the drain line 74 that leads back to the reservoir 64. The increased flow to the one chamber 48 or 50 expands the chamber and forces the piston 44 in the direction of the opposite chamber 48 or 50. Movement of the piston 44 is transmitted through the piston rod 60 to the rack gear 12. The rack gear 12 slides lengthwise in the housing 34 and causes the steerable vehicle wheels 16 and 18 to turn. As the rack gear 12 moves along its longitudinal axis, the meshing pinion gear 38 rotates about its central axis. Because the pinion gear 38 is connected to the valve assembly 28, rotation of the gear tends to move the valve assembly back to its initial or neutral position. When the steerable vehicle wheels 16 and 18 have been turned to a extent corresponding to the extent of rotation of the steering wheel 26, the valve assembly 28 returns to its initial or neutral position to interrupt operation of the power steering motor 30.

Although the power steering system 10 is shown in FIG. 1 as being an end-type power take-off rack and pinion system, a center-type power take-off system could be used. Also, the teeth of the rack gear 12 could be formed on the outer circumference of an elongated piston 44, with the piston rod 60 mounting the tie rods 20 and 22.

Valve Assembly

The valve assembly 28 includes a generally cylindrical valve sleeve 78 (see FIG. 2) which is disposed in a cylindrical valve chamber 80 formed in a housing 82. A hollow valve spool 86 is disposed in a cylindrical passage 88 formed in the valve sleeve 78. The valve spool 86 has an outer end or stem portion 90 which is connected with the steering wheel 26.

The valve sleeve 78 is provided with a plurality of circular lands which are effective to separate various areas of the valve chamber 80 from each other. Thus, an upper portion (as viewed in FIG. 2) of the valve chamber 80 is separated from an annular groove 92 formed in the valve spool 78 by an annular land 94. The upper portion of the valve chamber 80 is connected in fluid communication with the reservoir 64 through the conduit 74 in the manner indicated schematically by the arrow 96 in FIG. 2.

The annular groove 92 is continuously connected with the pump 66 through the conduit 68 in the manner indicated schematically by the arrow 98 in FIG. 2. A second annular groove 102 formed in the valve spool 78 is connected with the head end chamber 48 of the motor 30 by the conduit 70. Upon actuation of the valve assembly 28, the groove 102 is connected with either the relatively low pressure at the upper end portion of the valve spool or the relatively high pressure in the groove 92. Therefore, fluid flows either to or from the head end chamber 48 of the power steering motor 30 in the manner indicated schematically by the arrow 104 in FIG. 2.

Still another groove 106 formed in the valve spool 78 is connected with the rod end chamber 50 of the motor 30 by the conduit 72. Upon actuation of the valve assembly 28, the annular groove 106 is connected with either the relatively low fluid pressure at the upper end portion of the valve spool 86 or with the relatively high fluid pressure in the groove 92. Therefore, fluid flows either to or from the rod end motor cylinder chamber 50 in the manner indicated schematically by the arrow 108 in FIG. 2. The manner in which the valve spool 86 and valve sleeve 78 cooperate with each other upon rotation of the steering wheel 26 is well known.

Figure 5:
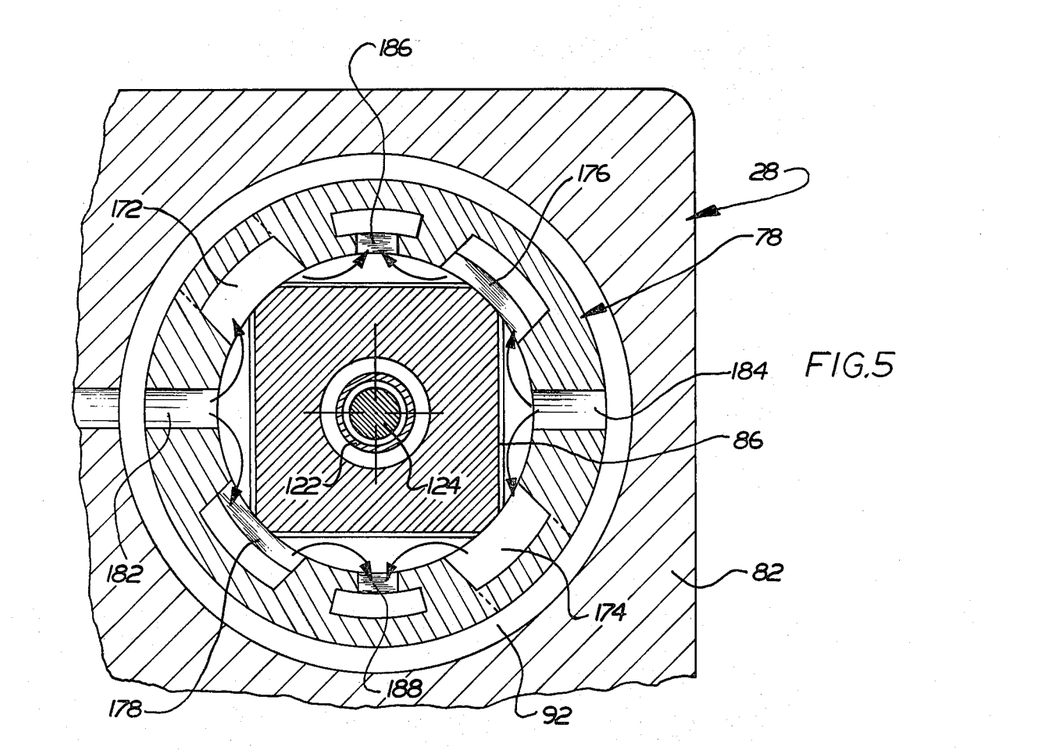
FIG. 5 is a fragmentary sectional view, taken generally along the line 5—5 of FIG. 2, illustrating the relationship between a valve spool and valve sleeve when the valve assembly is in the initial or fully open condition.

Upon rotation of the valve spool 86 through an increment of movement in either direction from the initial position of FIG. 5, the fluid pressure in either the head end chamber 48 or the rod end chamber 50 of the power steering motor 30 is increased to the same extent. Thus, rotation of the valve spool 86 relative to the valve sleeve 78 through an increment of movement in the direction of the arrow 112 in FIG. 2 causes the fluid pressure in the head end chamber 48 to increase by a predetermined amount. Similarly, rotation of the valve spool through an increment of movement in the direction of the arrow 114 in FIG. 2 causes the fluid pressure in the rod end chamber 50 to increase by the same predetermined amount.

The fluid pressure in the head end chamber 48 or in the rod end chamber 50 increases by the same amount in response to an increment of movement of the valve spool 86. However, a greater increase in the output force applied against the rack gear 12 by the power steering motor 30 is obtained by an incremental increase in the fluid pressure in the head end chamber 48 than is obtained by an incremental increase in the fluid pressure in the rod end chamber 50. This is because the head end surface area 54 of the piston 44 is greater than the rod end surface area 56.

During operation of a vehicle, it is desirable for an operator who is rotating the steering wheel 26 to encounter a resistance to rotation which varies as a direct function of the force transmitted from the power steering motor 30 to the rack gear 12. This is desireable in order to provide an operator with a feel for the force being applied to the steerable vehicle wheels 16 and 18. However, an increase in the fluid pressure in the head end chamber 48 results in a greater output force from the motor 30 than does the same increase in the fluid pressure in the rod end chamber 50. Therefore, in order to provide an operator of the vehicle with a feel for the force being exerted on the rack gear and steerable vehicle wheels by the power steering motor 30, the resistance to rotation of the valve spool 86 in a direction porting fluid pressure to the head end chamber 48 must be greater than the resistance of the valve spool to rotation in a direction porting fluid pressure to the rod end chamber 50.

Spring Assembly

In accordance with a feature of the present invention, a spring assembly 120 is effective to compensate for the fact that the head end surface area 54 of the piston 44 is greater than the rod end surface area 56. Thus, the spring assembly 120 resists actuation of the valve assembly 28 with a greater force upon rotation of the steering wheel 26 in a direction porting fluid pressure to the head end chamber than is exerted upon rotation of the steering wheel 26 in a direction porting fluid pressure to the rod end chamber 50.

In order to provide the operator with feel which is indicative of the manner in which the output force on the power steering motor varies with actuation of the valve assembly 28, the ratio of the resistance of the valve assembly 28 to actuation in a direction porting fluid pressure to the head end chamber 48 to the resistance of the valve assembly 28 to actuation in a direction porting fluid pressure to the rod end chamber 50 is at least approximately the same as the ratio of the head end surface area 54 to the rod end surface area 56. Thus, the ratio of the force required to turn the valve spool 86 through an increment of distance in the direction of the arrow 112 to the force required to turn the valve spool 86 in the direction of the arrow 114 is at least approximately equal to the ratio of the head end surface area 54 to the rod end surface area 56. This can be expressed by the following equation:

$$\frac{\text{Force to turn valve spool 86 in direction of arrow 112}}{\text{Force to turn valve spool 86 in direction of arrow 114}} = \frac{\text{Head end surface area 54}}{\text{Rod end surface area 56}}$$

Therefore, the force resisting actuation of the valve assembly 28 is proportional to the force applied to the rack gear 12 by the power steering motor 30. This results in the feel transmitted to an operator upon turning of the steering wheel 26 being proportional to the force which is actually being applied to the rack gear 12 even though the head end surface area 54 of the piston 44 is greater than the rod end surface area 56.

The spring assembly 120 includes a pair of torsion springs, that is a torsion tube 122 and a torsion bar 124 which is disposed within the torsion tube. Upon rotation of the valve spool 86 in a direction to port fluid pressure to the head end chamber 48, that is upon rotation of the valve spool in the direction of the arrow 112, the movement of the valve spool is resisted by both the torsion tube 122 and the torsion bar 124. However, upon rotation of the valve spool 86 in a direction to port fluid pressure to the rod end chamber 50, that is upon rotation of the valve spool in the direction of the arrow 114, the movement of the valve spool is resisted by only the torsion bar 124.

Since both the torsion tube 122 and torsion bar 124 must be twisted or deflected to rotate the valve spool 86 to port fluid pressure to the head end chamber 48, a relatively large force is required to overcome the combined influence of the torsion tube 122 and torsion bar 124. However upon rotation of the valve spool 86 in a direction to port fluid pressure to the rod end chamber 50, a relatively small force is required to overcome only the resistance of the torsion bar 124.

The torsion tube 122 and torsion bar 124 are sized to provide the valve assembly 28 with a resistance to actuation which is proportional to the force applied to the rack gear 12 by the power steering motor 30. Therefore, the ratio of the sum of the spring constants or rates of the torsion tube and torsion bar to the spring constant or rate for the torsion bar is approximately the same as the ratio of the head end surface area 54 to the rod end surface area 56 of the piston 44. This relationship can be expressed by the following equation:

$$\frac{KT + KB}{KB} = \frac{\text{Area 54}}{\text{Area 56}}$$

where:
KT is the spring constant or rate of the torsion tube.
KB is the spring constant or rate of the torsion bar.
Area 54 is the head end area of the piston 44.
Area 56 is the rod end area of the piston 44.

As used above, spring constant or rate refers to the torque required to twist the torsion tube 122 or bar 124 through one radian of movement. Of course, spring constant or rate also refers to the force required to move a nontorsion spring through one unit or increment of displacement.

The torsion tube 122 and bar 124 have longitudinal central axes which are coincident with the common axis 128 about which the valve sleeve 86, valve spool 78 and pinion 38 rotate during operation of the power steering system 10. An outer end portion 132 of the hollow cylindrical torsion tube 122 is fixedly connected with the outer end portion 90 of the valve spool 86 by a connector pin 134. The connector pin 134 is also effective to fixedly connect the outer end portion 136 of the cylindrical torsion bar 124 with the outer end 132 of the torsion tube 122 and with the outer end portion 90 of the valve spool 86. Thus, upon rotation of the valve spool 86 relative to the valve sleeve 78, the outer end portion 132 of the torsion tube 122 and the outer end portion 136 of the torsion bar 124 rotate with the valve spool.

Lost Motion Connection

A lost motion connection 140 (see FIGS. 2 and 3) is effective to connect an inner end portion 144 of the torsion tube 124 and an inner end portion 146 of the torsion bar 122 with the pinion 38. The pinion 38 and valve sleeve 78 are fixedly interconnected by a pin 150. Therefore, the valve sleeve 78 rotates with the pinion gear 38 and the inner end portion 146 of the torsion bar 122 upon movement of the rack gear 12 along its longitudinal central axis.

The lost motion connection 140 includes a pin 154 which extends diametrically across an opening 156 formed on the outer end portion of the pinion gear 38. The pin 154 extends through a diametrically extending slot 158 formed in the inner end portion 144 of the torsion tube 122. The pin 154 also extends through a cylindrical opening 160 formed in the inner end portion 146 of the torsion bar 124. The pin 154 fixedly connects the inner end portion 146 of the torsion bar 124 with the pinion gear 38.

The lost motion connection 140 is effective to cause deflection of both the torsion tube 122 and torsion bar 124 upon rotation of the valve spool 86 in the direction of the arrow 112 in FIG. 2. However, the lost motion connection 140 is effective to cause only deflection of the torsion bar 124 upon rotation of the valve spool 86 in the direction of the arrow 114 in FIG. 2.

Initial actuation of the valve assembly 28 to port fluid to the head end chamber 48 results in the torsion tube and bar 122 and 124 being twisted in a clockwise direction (as viewed in FIG. 3) by the valve spool 86. During this initial actuation of the valve assembly 28, the pinion gear 38 and pin 154 are stationay. Therefore, the pin 154 is effective to hold the inner end portions of the torsion tube and bar 122 and 124 against relative movement.

At this time, there is no relative movement between the torsion tube 122 and torsion bar 124 and no lost motion in the connection 140. Thefore, the amount of force resisting initial actuation of the valve assembly 28 is equal to the arcuate distance through which the torsion tube and bar 122 and 124 are twisted by rotation of the steering wheel 26 times the sum of the spring constants for the torsion tube and bar.

Figure 4:
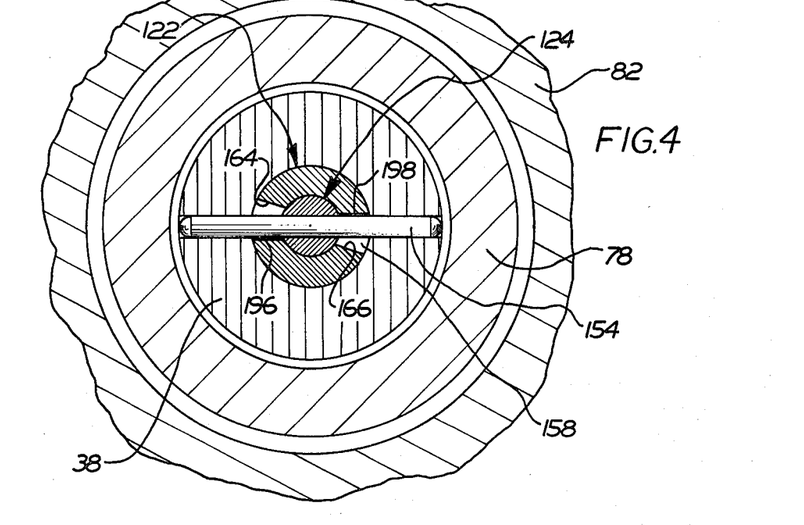
FIG. 4 is a sectional view, similar to FIG. 3, illustrating the lost motion coupling when the valve assembly is in an actuated condition.

On the other hand, initial actuation of the valve assembly 28 to port fluid to the rod end chamber 50 results in the outer ends 132 and 136 of the torsion tube and bar 122 and 124 being twisted in a counterclockwise direction (as viewed in FIG. 3) with the valve spool 86. During this initial actuation of the valve assembly 28, the pinion gear 38 is stationary. Therefore the pin 154 is effective to hold the inner end portion of the torsion bar 124 against movement from the position shown in FIG. 3. However, the inner end portion of the torsion tube 122 is free to move from the position shown in FIG. 3 to the position shown in FIG. 4. This results in the surfaces 164 and 166 moving out of engagement with the pin 154 and, if the valve assembly 28 is operated to a fully actuated condition, movement of the opposite side surfaces 196 and 198 of the slot 158 into engagement with the pin 154 (see FIG. 4).

As the valve assembly 28 is initially actuated to port fluid to the rod end chamber 50, only the torsion bar 124 is deflected. This is because the inner end of the torsion bar 124 is held against rotational movement by the pin 154 while the outer end 136 of the torsion bar is rotated with the stem 90 of the valve spool 86 by the pin 134 (FIG. 2). The inner end of the torsion tube 122 is free to move relative to the torsion bar 124 from the position shown in FIG. 3 to the position shown in FIG. 4 as the outer end portion 132 (see FIG. 2) of the torsion tube is rotated with the stem 90 of the valve spool 86. The amount of force resisting actuation of the valve assembly at this time will be equal to the arcuate distance through which the torsion bar 124 is twisted times the spring constant for the torsion bar.

Operation of Valve and Spring Assemblies

When the valve spool 86 is in the initial or fully open condition illustrated in FIG. 5, the relationship between the pin 154 and the torsion tube 122 and bar 124 is the same as is shown in FIG. 3. At this time, the side surfaces 164 and 166 of the slot 158 are disposed in abutting engagement with the outer side surface of the pin 154. In addition, the fluid conduits 70 and 72 (FIG. 1) leading to the head end chambers 48 and rod end chambers 50 of the power steering motor 30 are connected in fluid communication with both the conduit 68 from the pump 66 and the return conduit 74 connected with the reservoir 64.

The valve spool 78 (see FIG. 5) is provided with a pair of axially extending motor ports 172 and 174 which are connected in fluid communication with the groove 102 (FIG. 2) which is connected with the conduit 70 (FIG. 1) leading to the head end chamber 48 of the motor 30. A second pair of axially extending motor ports 176 and 178 (FIG. 5) in the valve sleeve 78 are connected with the annular groove 106 (FIG. 2) leading to the conduit 72 (FIG. 1) and the rod end chamber 50 of the power steering motor 30. A pair of fluid inlet ports 182 and 184 (FIG. 5) in the valve sleeve 78 are connected with the annular groove 92 (FIG. 2) and the fluid supply conduit 68 (FIG. 1). In addition, a pair of return ports 186 and 188 (FIG. 5) are connected in fluid communication with the upper end portion of the valve chamber 80 and the fluid return conduit 74.

When the valve spool 86 is in the initial condition shown in FIG. 5, fluid is free to flow from the inlet port 182 in the valve sleeve 78 to the two motor ports 172 and 178 connected with the head and rod end chambers 48 and 50. Similarly, fluid can flow from the inlet port 184 to the motor ports 174 and 176 connected with the head end chamber 48 and rod end chamber 50. Fluid can also flow from the head end chamber 48 through the motor port 172 to the outlet port 186 and through the motor port 174 to the fluid outlet port 188. Fluid can flow from the rod end chamber 50 through the motor port 176 to the outlet port 186 and through the motor port 178 to the outlet port 188. Thus, the valve assembly 28 is of the open center type in which the fluid pressure in the head and rod end chambers 48 and 50 is equalized when the valve assembly is in the initial or fully opened condition of FIG. 5.

Rotation of the steering wheel 26 rotates the valve spool 86 relative to the valve sleeve 78 to increase the communication of a pair of motor ports connected with one of the motor chambers 48 or 50 with the fluid supply conduit 68. This rotational movement also increases the communication of a second pair of a motor ports connected with the other chamber with the fluid return conduit.

Assuming that the steering wheel 26 is rotated in a direction to port fluid under pressure to the head end chamber 48, the valve spool 86 is rotated in the direction of the arrow 112 in FIG. 2 or clockwise as viewed in FIG. 5. This results in an increase in the fluid communication of the fluid inlet port 182 with the motor port 172 leading to the head end chamber 48. The fluid communication between the fluid inlet port 184 and the port 174 leading to the head end chamber 48 is also increased. The extent of the increase of fluid pressure which is conducted to the head end chamber 48 of the power steering motor 30 will vary as a direct function of the extent to which the valve spool 86 is rotated about its central axis. At the same time, rotation of the valve spool 86 about its central axis will increase the communication of the ports 176 and 178 leading to the rod end chamber 50 with the fluid return ports 186 and 188.

This rotation of the valve spool 86 in the direction of the arrow 112 twists both the torsion tube 122 and bar 124. This is because the inner end portions 144 and 146 of the torsion tube 122 and bar 124 are connected with the stationary pin 154. The outer end portions 132 and 136 of the torsion tube 122 and bar 125 are connected with the valve spool 86. Therefore, rotation of the valve spool 86 is resisted under the combined influence of the torsion tube 122 and the torsion bar 124 to provide a relatively large feel force to an operator who is turning the steering wheel 26.

Upon rotation of the steering wheel 26 in the opposite direction to rotate the valve spool 86 in the direction of the arrow 114 in FIG. 2, the valve spool 86 is rotated in a counterclockwise direction (as viewed in FIG. 5). This increases the fluid communication of the motor ports 176 and 178 with the inlet ports 184 and 182. The motor ports 176 and 178 are connected with the rod end chamber 50 of the power steering motor. At the same time, the communication of the motor ports 172 and 174 with the outlet ports 186 and 188 is increased to decrease the fluid pressure in the head end chamber 48. The extent of the increase in fluid pressure in the rod end chamber 50 and the extent of the decrease of the fluid pressure in the head end chamber 48 is directly proportional to the extent to which the valve spool 86 is rotated relative to the sleeve 78.

The torsion tube 122 is ineffective to resist rotation of the valve spool 86 in the direction of the arrow 114 in FIG. 2. This is because the lost motion connection 140 allows the inner end portion 144 of the torsion tube 122 to move from the initial position shown in FIG. 3 to the actual position shown in FIG. 4. Therefore, the torsion tube 122 is not deflected as the valve spool 86 moves in the direction of the arrow 114 in FIG. 2 to port fluid to the head end chamber 50.

However, the torsion bar 124 is effective to apply a force resisting rotational movement of the valve spool 86 in the direction of the arrow 114 in FIG. 2. This is because the inner end portion 146 of the torsion bar 124 is held against any rotational movement relative to the pin 154 by the momentarily stationary pin 154 and pinion gear 38. Since only the torsion bar 124 is deflected upon rotation of the valve spool 86 in the direction of the arrow 114 in FIG. 2, a relatively small force resists rotational movement of the valve spool 86 so that a relatively low resistance or feel force is transmitted to the steering wheel 26. Of course, this relatively low resistance or feel force corresponds to the relatively low output force applied to the rack gear 12 by the power steering motor 30 when fluid pressure is directed to the rod end chamber 50.

In the illustrated embodiment of the invention, the lost motion connection 140 cooperates with the torsion bar 122 and torsion tube 124 so that only the torsion bar 124 is deflected upon initial rotation of the valve spool 86 in the direction of the arrow 114. It is contemplated that the lost motion connection could be constructed so that only the torsion tube would be deflected upon initial rotation of the valve spool in the direction of the arrow 114. If this was done, both the torsion bar 122 and the torsion tube 124 would be deflected upon rotation of the valve spool in the direction of the arrow 112.

Summary

In view of the foregoing it is apparent that the present invention provides a new and improved apparatus for use in a power steering system 10 to effect turning movement of a steerable vehicle wheel 16 or 18. The apparatus includes a power steering motor 30 having surface areas 54 and 56 of different sizes against which fluid pressure is applied to effect turning movement of a steerable vehicle wheel in different directions. The spring assembly 120 is provided to resist actuation of a control valve assembly 28 which ports fluid pressure to the power steering motor 30.

In accordance with a feature of the present invention, the spring assembly 120 is effective to resist actuation of the valve assembly 28 with a force which varies as a function of both the extent of actuation of the valve assembly and the size of the motor surface area 54 or 56 against which fluid pressure is being directed. When fluid pressure is being directed against a relatively large surface area 54 of the power steering motor 30, the spring assembly 120 provides a relatively large resistance to each increment of actuation of the valve assembly 28. Similarly, when fluid pressure is being directed against a relatively small surface area 56 of the power steering motor, the spring assembly 120 provides a relatively small resistance to each increment of actuation of the valve assembly 28. Therefore, when equal forces are supplied to effect actuation of the valve assembly 28 in opposite directions, equal output forces are obtained from the power steering motor 30 even though the pressurized operating surface areas 54 and 56 of the power steering motor 30 are of different sizes.

Having described one specific preferred embodiment of the invention, the following is claimed:

1. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, and spring means for resisting actuation of said valve means in the first direction with a first spring force and for resisting actuation of said valve means in the second direction with a second spring force which is smaller than the first spring force, said spring means including first and second spring members which are deflected upon actuation of said valve means in the first direction from the initial condition to provide the first spring force, only said first spring member being deflected upon actuation of said valve means in the second direction from the initial condition to provide the second spring force.

2. An apparatus as set forth in claim 1 wherein said valve means includes a valve member which is rotatable in the first and second directions about its central axis, said first and second spring members having central axes which are aligned with the axis of rotation of said valve member.

3. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, and spring means for resisting actuation of said valve means in the first direction with a first spring force and for resisting actuation of said valve means in the second direction with a second spring force which is smaller than the first spring force, said spring means including first and second torsion springs, said apparatus further including means for deflecting said first and second torsion springs upon actuation of said valve means in the first direction from the initial condition and for deflecting only said second torsion spring upon actuation of said valve means in the second direction from the initial condition.

4. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, and spring means for resisting actuation of said valve means in the first direction with a first spring force and for resisting actuation of said valve means in the second direction with a second spring force which is smaller than the first spring force, the ratio of said first spring force to said second spring force being at least approximately equal to the ratio of said first surface area to said second surface area.

5. An apparatus as set forth in claim 4, wherein said power steering motor includes a housing defining a chamber, a piston disposed in said chamber, said piston having a first side upon which said first surface area is disposed and a second side upon which said second surface area is disposed, and a piston rod connected with said second side of said piston.

6. An apparatus as set forth in claim 4, further including a rack gear connected with said power steering motor and with the steerable vehicle wheel, a pinion gear disposed in meshing engagement with said rack gear, first connection means for connecting said spring means with said pinion gear, and second connection means for connecting said spring means with said valve means.

7. An apparatus as set forth in claim 4 wherein said spring means includes a torsion bar and a torsion tube, said torsion bar being disposed within said torsion tube in a coaxial relationship with said torsion tube.

8. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, a rack gear connected with said power steering motor and steerable vehicle wheel, a pinion gear disposed in meshing engagement with said rack gear, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, spring means for resisting actuation of said valve means in the first direction with a first spring force and for resisting actuation of said valve means in the second direction with a second spring force which is smaller than the first spring force, first connection means for connecting said spring means with said pinion gear, and second connection means for connecting said spring means with said valve means, said spring means including first and second spring members, one of said connection means includes means for transmitting force to effect deflection of said first and second spring members upon movement of said valve means in the first direction from said initial condition, said one of said connection means being effective to transmit force to effect deflection of only said first spring member upon actuation of said valve means in the second direction from said initial condition.

9. An apparatus as set forth in claim 8 wherein said one of said connection means includes means for enabling said first spring member to move relative to said second spring member upon actuation of said valve means in the second direction from said initial condition.

10. An apparatus as set forth in claim 8 wherein said first spring member is a torsion bar and said second spring member is a torsion tube which circumscribes said torsion bar and is disposed in a coaxial relationship with said torsion bar and said pinion gear.

11. An apparatus as set forth in claim 10 wherein said valve means includes a hollow rotatable valve member which circumscribes said torsion tube and is coaxial with said torsion tube.

12. An apparatus as set forth in claim 11 wherein said torsion bar has first and second end portions, said first end portion of said torsion bar being fixedly connected with said pinion gear by said first connection means, said second end portion of said torsion bar being fixedly connected with said valve member by said second connection means.

13. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, and spring means for resisting actuation of said valve means in the first direction with a first spring force and for resisting actuation of said valve means in the second direction with a second spring force which is smaller than the first spring force, said spring means including a torsion bar and a torsion tube, said torsion bar being disposed within said torsion tube in a coaxial relationship with said torsion tube, said torsion bar having a first end portion fixedly connected with a first end portion of said torsion tube, said torsion bar having a second end portion which is connected with a second end portion of said torsion tube for movement therewith upon actuation of said valve means in the first direction from the initial condition, said second end portion of said torsion bar being movable relative to said second end portion of said torsion tube upon actuation of said valve means in the second direction from the initial condition.

14. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, and spring means for resisting actuation of said valve means in the first direction with a first spring force and for resisting actuation of said valve means in the second direction with a second spring force which is smaller than the first spring force, said spring means including a torsion bar and a torsion tube, said torsion bar being disposed within said torsion tube in a coaxial relationship with said torsion tube, the ratio of the sum of the spring rates of said torsion bar and torsion tube to the spring rate of said torsion bar is substantially equal to the ratio of the first surface area to the second surface area.

15. An apparatus for use in a power steering system to effect turning movement of a steerable vehicle wheel, said apparatus comprising a power steering motor adapted to be connected with the steerable vehicle wheel, said power steering motor including a first surface area against which fluid pressure is applied to effect turning movement of the steerable vehicle wheel in one direction and a second surface area against which fluid pressure is applied to effect turning movement of the steerable vehicle wheel in another direction, said first surface area being larger than said second surface area, valve means for porting fluid pressure to said power steering motor, said valve means being actuatable in a first direction from an initial condition to effect an increase in the fluid pressure applied to said first surface area and being actuatable in a second direction from the initial condition to effect an increase in the fluid pressure applied to said second surface area, and spring means for resisting actuation of said valve means through an incremental distance in the first direction from the initial condition with a first spring force which is independent of vehicle speed and for resisting actuation of said valve means through the same incremental distance in the second direction from the initial condition with a second spring force which is independent of vehicle speed and is smaller than the first spring force.

16. An apparatus for use in a power steering system to effect turning movement of a steerable vehicle wheel, said apparatus comprising a housing, a hollow rotatable valve member disposed in said housing, a torsion tube member disposed within said valve member and having a longitudinal central axis which is coincident with the axis of rotation of said valve member, a torsion bar member disposed within said torsion tube member and having a longitudinal central axis which is coincident with the axis of rotation of said valve member, and means for deflecting said torsion tube and bar members upon rotation of said valve member in a first direction to provide a first spring force resisting rotational movement of said valve member and for deflecting only one of said torsion tube and bar members upon rotation of said valve member in a second direction to provide a second spring force resisting rotational movement of said valve member, said second spring force being less than said first spring force.

17. An apparatus as set forth in claim 16 further including a rotatable valve sleeve circumscribing said valve member, said torsion bar member having first and second end portions, said first end portion of said torsion bar member being connected with said valve member for rotation therewith and said second end portion of said torsion bar member being connected with said valve sleeve for rotation therewith, said torsion tube member having first and second end portions, said first end portion of said torsion tube member being connected with said valve member and said second end portion of said torsion tube member being connected with said valve sleeve, one of said end portions of said torsion tube member being rotatable relative to said torsion bar member upon rotation of said valve member in the second direction.

18. An apparatus as set forth in claim 16 further including first connector means for fixedly connecting a first end of said torsion tube member with a first end of said torsion bar member and second connector means for connecting a second end of said torsion tube member with a second end of said torsion bar member for rotation therewith upon rotation of said valve member in the first direction and for enabling relative movement to occur between the second end of said torsion tube member and the second end of said torsion bar member upon rotation of said valve member in the second direction.

19. An apparatus for use in a power steering system to effect turning movement of a steerable vehicle wheel, said apparatus comprising a rack gear adapted to be connected with the steerable vehicle wheel, said rack gear being movable along its longitudinally extending central axis to effect turning movement of the steerable vehicle wheel, a rotatable pinion gear disposed in meshing engagement with said rack gear, said pinion gear being rotatable about its central axis upon movement of said rack gear along its longitudinal central axis, a fluid motor connected with said rack gear, said fluid motor including a housing defining a cylinder chamber, a movable piston disposed in said housing and dividing said cylinder chamber into a variable volume head end chamber and a variable volume rod end chamber, said piston having a head end surface area exposed to fluid pressure in said head end chamber and a rod end surface area exposed to fluid pressure in said rod end chamber, said head end surface area being larger than said rod end surface area, and a piston rod connected with said piston adjacent to said rod end surface area and extending through the rod end chamber, said piston rod being connected with said rack gear to enable fluid pressure forces applied against said piston to be transmitted to said rack gear, valve means for porting fluid pressure to said fluid motor, said valve means including a hollow rotatable valve sleeve disposed in a coaxial relationship with said pinion gear and connected with said pinion gear for rotation therewith, a hollow rotatable valve spool disposed within said valve sleeve in a coaxial relationship therewith, said valve spool being rotatable relative to said valve sleeve in a first direction from an initial condition to port fluid pressure to said head end chamber and being rotatable relative to said valve sleeve in a second direction from the initial condition to port fluid pressure to said rod end chamber, and means for applying a first force to said valve spool upon rotation of said valve spool in the first direction from the initial condition and for applying a second force to said valve spool upon rotation of said valve spool in the second direction from the initial condition, said first force being larger than said second force and the ratio of said first force to said second force being at least approximately equal to the ratio of said head end surface area to said rod end surface area.

20. An apparatus as set forth in claim 19 wherein said means for applying said first and second forces to said valve spool includes a pair of springs and connector means for enabling both springs of said pair of springs to resist rotation of said valve spool in said first direction from the initial condition and for enabling only one spring of said pair of springs to resist rotation of said valve spool in said second direction from the initial condition.

21. An apparatus as set forth in claim 19 wherein said means for applying first and second forces to said valve spool includes first and second spring members having central axes which are coincident with the axis of rotation of said valve spool.

22. An apparatus as set forth in claim 21 wherein said first spring member has a first end portion connected with said valve sleeve for rotation therewith and a second end portion connected with said valve spool for rotation therewith.

23. An apparatus as set forth in claim 22 wherein said second spring member has a first end portion which is connected with one of said valve sleeve and valve spool for rotation therewith and a second end portion which is connected to the other of said valve sleeve and valve spool for rotation therewith upon rotation of said valve spool in the first direction from the initial condition.

24. An apparatus as set forth in claim 19 wherein said means for applying first and second forces to said valve spool includes a torsion tube disposed within said valve spool and a torsion bar disposed within said torsion tube.

25. An apparatus as set forth in claim 24 wherein said torsion tube has first and second end portions, said torsion bar having a first end portion fixedly connected with said first end portion of said torsion tube and with said valve spool, said torsion bar having a second end portion which is fixedly connected with said pinion gear and said valve sleeve for rotation therewith, said means for applying first and second forces to said valve spool further including means for rotating said second end portion of said torsion tube with said second end portion of said torsion bar upon rotation of said valve spool in the first direction from the initial condition and for enabling relative rotation to occur between said second end portion of said torsion tube and said second end portion of said torsion bar upon rotation of said valve spool in the second direction from the initial condition.

26. An apparatus as set forth in claim 24 wherein said torsion tube and said torsion bar are disposed in a coaxial relationship with said valve spool and said valve sleeve.

27. An apparatus as set forth in claim 24 wherein said torsion tube has first and second end portions, said torsion bar having a first end portion fixedly connected with said first end portion of said torsion tube, said torsion bar having a second end portion, said means for applying first and second forces to said valve spool further including means for rotating said second end portion of said torsion tube with said second end portion of said torsion bar upon rotation of said valve spool in the first direction from the initial condition and for enabling relative rotation to occur between said second end portion of said torsion tube and said second end portion of said torsion bar upon rotation of said valve spool in the second direction from the initial condition.

28. An apparatus for use in a power steering system to effect turning movement of a steerable vehicle wheel, said apparatus comprising a fluid motor adapted to be connected with the steerable vehicle wheel, said fluid motor including a housing defining a cylinder chamber, a piston disposed in said housing and dividing said cylinder chamber into a variable volume head end chamber and a variable volume rod end chamber, said fluid motor having a head end surface area exposed to fluid pressure in said head end chamber and a rod end surface area exposed to fluid pressure in said rod end chamber, said head end surface area being larger than said rod end surface area, and a piston rod connected with said piston adjacent to said rod end surface area and extending through the rod end chamber, valve means for porting fluid pressure to said fluid motor, said valve means including a rotatable valve member, said valve member being rotatable in a first direction from an initial condition to port fluid pressure to said head end chamber and being rotatable in a second direction from the initial condition to port fluid pressure to said rod end chamber, spring means for resisting rotation of said valve member in the first and second directions, said spring means including first spring member having a first spring rate and a second spring member having a second spring rate, means for deflecting said first and second spring members upon rotation of said valve member in the first direction to resist rotation of said valve member in the first direction with a first spring force, and means for deflecting only said first spring member upon rotation of said valve member in the second direction to resist rotation of said valve member in the second direction with a second spring force, the ratio of the sum of said first and second spring rates to said first spring rate being at least substantially equal to the ratio of said head end surface area to said rod end surface area.

29. An apparatus as set forth in claim 28 wherein said first and second spring members have longitudinally extending central axes, said means for deflecting said first and second spring members includes means for deflecting said first and second spring members about their longitudinally extending axes, said means for deflecting only said first spring member including means for deflecting said first spring member about its longitudinally extending axis.

30. An apparatus as set forth in claim 29 wherein the longitudinally extending central axes of said first and second spring members are coincident with the axis of rotation of said valve member.

31. An apparatus as set forth in claim 28 wherein said valve member is hollow, said first and second spring members being disposed within said hollow valve member.

32. An apparatus as set forth in claim 28 wherein said first spring member is a torsion bar and said second spring member is a torsion tube, said first spring member being disposed within said second spring member.

* * * * *